UNITED STATES PATENT OFFICE.

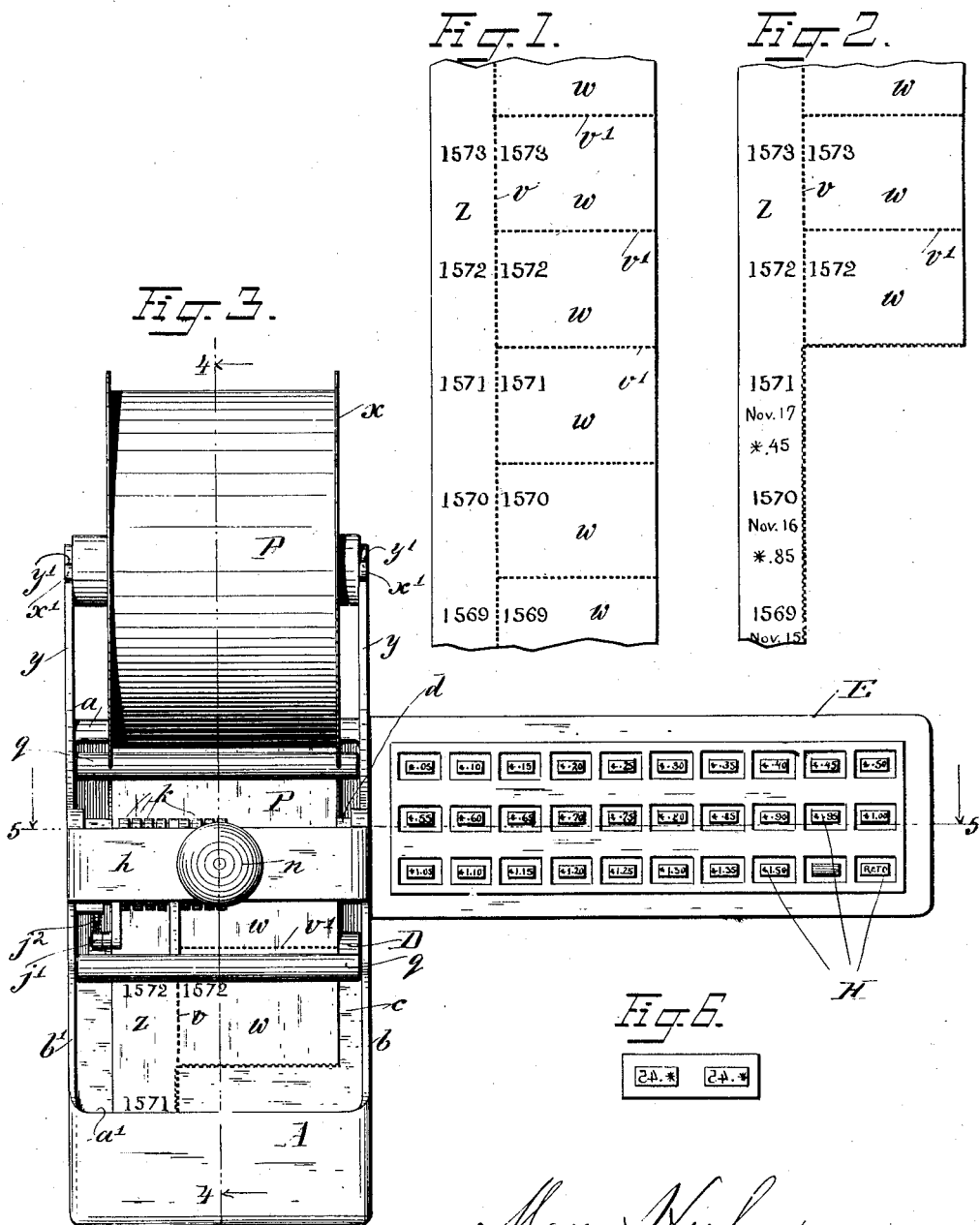

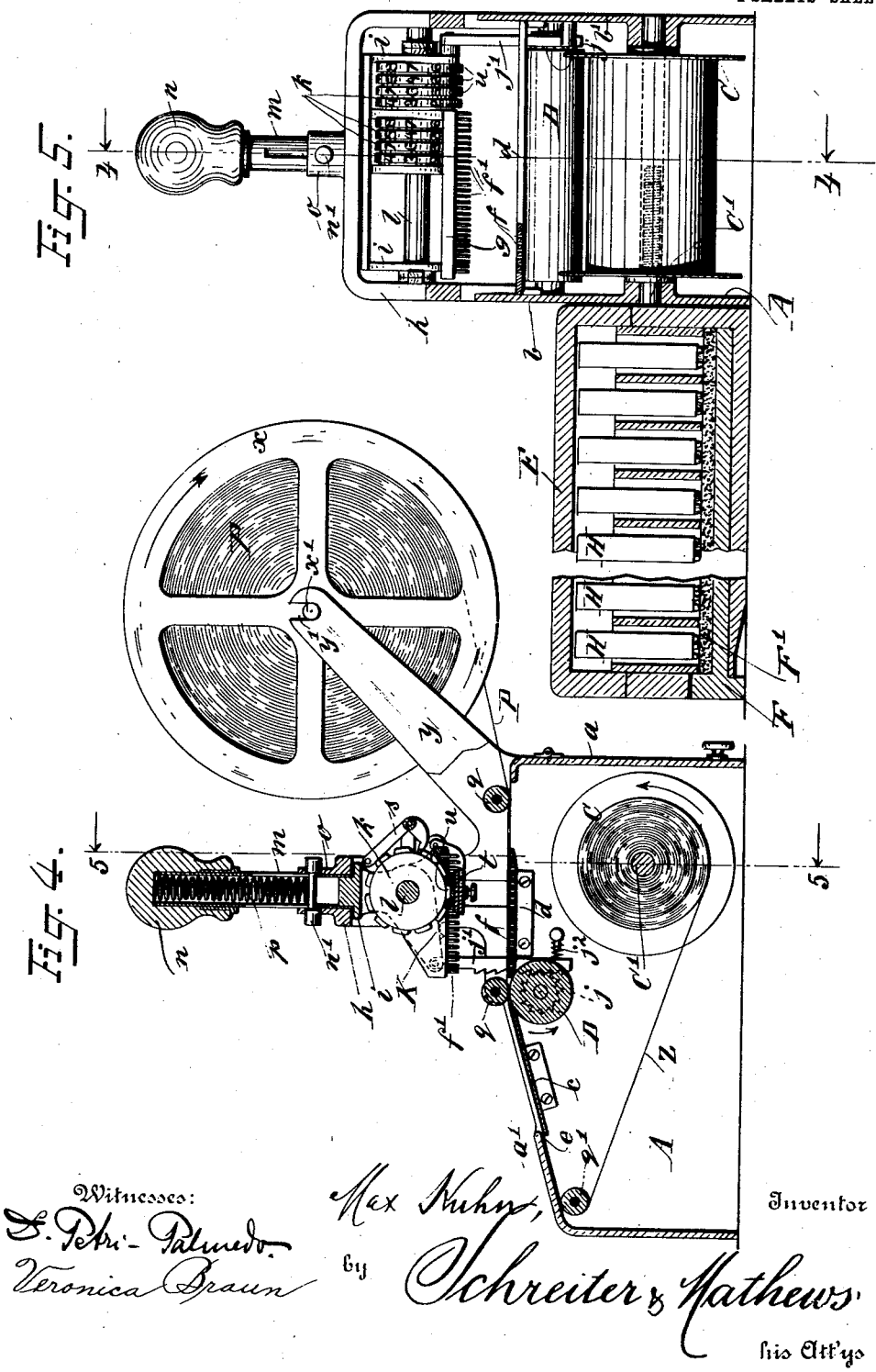

MAX KUHN, OF NEW YORK, N. Y.

CHECKING AND CONTROLLING MACHINE.

No. 924,245.　　　Specification of Letters Patent.　　　Patented June 8, 1909.

Application filed February 8, 1908. Serial No. 414,961.

*To all whom it may concern:*

Be it known that I, MAX KUHN, of the city, county, and State of New York, have invented new and useful Improvements in Checking and Controlling Machines, of which the following is a full, clear, and exact specification, reference being had to the accompanying drawings, wherein—

Figure 1 is a plan view of the combined tally sheet and check as produced by my improved machine; Fig. 2 is a similar view showing some of the detachable coupons or checks removed; Fig. 3 is a plan view of my improved checking and controlling machine; Fig. 4 is a sectional view thereof on line 4—4, indicated in Fig. 3, partly in elevation; Fig. 5 is a sectional view of the machine on line 5—5 indicated in Fig. 4; and Fig. 6 is a bottom view of a "double die", as may be used in connection with my improved checking and controlling machine.

The object of my invention is to provide a simple mechanical device for checking and controlling of retail sales. To check and control retail sales effectively, the amount of the transaction must be entered not only on the check intended to be turned in, to the cashier, with the payment for the purchase, but also upon the record or tally sheet. It is equally necessary to make certain that the entry on the tally sheet shall agree with that on the check before the check is given out, and that each entry on the tally sheet should be distinguished from all others and in such a way as will identify the check, bearing the corresponding entry.

The simplest and most suitable device for entering the amount of each transaction on the tally sheet and on the check is by providing a tally sheet and check combined in one strip of paper, such for instance as shown in Fig. 1 of the drawing, the division between the tally sheet and the check being indicated by an indented or perforated line $v$, so the entries may be made one beside the other. This may then be done by a single die, repeating the impression of the amount once upon the tally sheet and once upon the check, or by what is known as "double printing dies", provided with two sets of printing blocks as shown in Fig. 6, some distance apart. By means of such "double printing dies" the charges may be entered (printed) upon such combined tally sheet and check in one action simultaneously by placing the die across the line, dividing the tally sheet from the check. The best way of designating the entries on the tally sheet, so as to identify them with the entries on the checks, is by consecutively numbering the checks and printing corresponding consecutive numbers upon the tally sheet at approximately equal intervals, for instance, in the manner illustrated in Fig. 1. This enables the printing of the amounts of the transaction on a line right underneath the number of the check and underneath the number of the corresponding entry on the tally sheet. These simple devices facilitate an effective keeping of a record of all transactions and make possible a ready tracing of any checks that may have been lost or destroyed. Such a record protects against substitution of checks previously used, and makes certain the finding of the amounts as were entered thereon. If it is desired to make the safeguard yet more complete, then in addition to the consecutive numbers, also the date of the day may be printed on the checks and the tally sheets, for instance, in the manner shown in Fig. 2. Thereby the entry is identified and distinguished from all others in two ways.

While it is perfectly feasible to prepare such combined tally sheets and checks, devised in the manner as shown in Fig. 1, ready for use, it is much more convenient and suitable to produce them as the checking and entering of the transaction progresses, and to do so, I have devised the checking and controlling machine forming the subject-matter of this application. Broadly considered, this machine consists essentially of a base, a duplicate stamping and perforating machine set thereon, a reel for a supply of a continuous strip of paper, and of a mechanism for feeding it as the operations of the machine progress. In addition, a reel for winding thereon of the accumulating tally sheet and devices for guiding it toward the reel from the printing platform may be provided, but these devices, while desirable and convenient, are not essential.

A checking and controlling machine, constructed according to my invention, is illustrated in Figs. 3, 4 and 5 of the drawings. Therein the reference letter A designates the base or casing, which is made hollow to afford space for housing therein the reel C, for winding thereon of the tally sheet, and a part of the feeding mechanism; the upper portion of the casing A, beginning near the end of the rear wall $a$, is open, and in this opening are secured, to the sides $b$ and $b'$ of the casing, the printing platforms $c$ and $d$. The platform $c$ is set slightly below the edge $a'$ of the casing to afford, between it and this edge $a'$, an opening, through which the tally sheet $z$, with the entries, etc. made thereon, is passed into the casing. The other platform $d$ supports the sheet $z$ while it is being divided into the tally sheet $z$ proper and the detachable checks or coupons $w$ and while the duplicate identifying numbers are being printed thereon. Platform $d$ is perforated, (see Figs. 4 and 5). The perforations $f$ are arranged in the shape of a right angle and correspond to the arrangement of the perforating needles $f'$ of the male die $g$ affixed to the yoke $i$ of the combined stamping and perforating machine. This machine is secured to the base A over the platform $d$ and consists of the stationary frame $h$, a movable yoke $i$, shaft $l$, set in the yoke, a duplicate set of type-wheels $k$, mechanism $s$ for automatically setting the type-wheels, an inking pad $t$ and mechanism for actuating it, the perforating die $g$, secured to the base of the yoke, plunger $m$, rigidly connected with the movable yoke $i$, and fitted into a bearing $o$ of the stationary frame $h$, and of a handle $n$. Plunger $m$ is hollow and is provided interiorly with the spring $p$ (see Fig. 4), set to bear against the handle $n$ and a pin $n'$. This spring is compressed when the handle $n$ is pressed down, whereby the machine is made to print and perforate, and, reacting, when the pressure on the handle is released, returns the operating parts of the machine to the starting position. During this return or upward stroke of the movable yoke, the type-wheels are set, their types $u$ in the lowest row are inked, and the machine set ready for next operation. The inking pad $t$ moves out of the way when the movable yoke $i$ is depressed. The mechanism $s$ for automatically setting and holding in position the type-wheels, the inking pad and mechanism for actuating it, are such as are employed in automatic numbering machines. These features are no part of my invention.

In the rear, the sides of the casing A are extended to form brackets $y$, whereon is supported the reel $x$, the shaft $x'$ of the reel being set in the notches $y'$ of the brackets $y$. The strip P of paper, wound on this reel, is passed underneath the rolls $q$, over the platforms $d$ and $c$, then over the roll $q'$ and its end is secured to the core $C'$ of the reel C, mounted within the casing. One end of the core $C'$ is hollow and a pinion is inserted therein, whereon a spiral spring is wound, having one end fixed to the core and the other to the pinion fixed in the bearing. All this is arranged in the manner employed in constructing spring shade rollers, and set so that the reel C will have a tendency to rotate in the direction indicated by an arrow in Fig. 4 of the drawing, thus causing the tally sheet $z$ to be wound on it, as the checking and printing operation progresses.

Interiorly in the casing, and right underneath the forward guide-roll $q$, the feeding device is located. It consists of a drum or roller D (see Fig. 4), the ratchet-wheel $j$, secured thereto; a ratchet-bar $j'$ connected with the yoke $i$ of the duplicate stamping machine and of a spring $j^2$, pressing the ratchet-bar $j'$ against the ratchet-wheel $j$. Spring $j^2$ permits the ratchet-bar $j'$ to slide on the ratchet-wheel $j$ during the downward stroke of the yoke $i$, during its upward stroke however, the ratchet-bar $j'$ engages with the ratchet-wheel $j$ and turns the roller D. The dimensions of the parts of this mechanism are so calculated, that the motion imparted to the ratchet-wheel $j$ during the upward stroke of the machine will turn the reel D in the direction indicated by the arrow in Fig. 4, a distance equal to the width of the detachable coupons or checks $w$. Thus the portion of the strip of paper, which has been printed upon and perforated by the downward stroke of the duplicate stamping and perforating machine is shifted, or fed forward, upon the platform $c$, and simultaneously, of course, a fresh portion of the strip of paper P is drawn upon the platform $d$ underneath the duplicate stamping and perforating machine.

Simultaneously with the duplicate printing of the consecutive numbers, the perforating device $g$, secured to the movable yoke produces at every downward stroke of the stamping machine an angular perforation in the strip P; one leg producing a part of the perforated line $v$, running approximately parallel with the edges of the strip P and separating the tally sheet $z$ from the other portion of the strip; the other leg produces the perforated transverse line $v'$, dividing this other portion of the strip into checks or coupons $w$. The duplicate numbers are printed on the check underneath the perforated line $v'$ and on the tally sheet in line therewith. Thus by each depression of the duplicate stamping machine, both duplicate numbers are printed and the strip of paper is perforated, so as to divide it into a continuous tally sheet $z$ and detachable checks or coupons $w$.

Box E (see Figs. 3 and 5) is a receptacle for the dies used in printing the amounts of the transactions. It is shown in connection with my improved checking and controlling machine as attached to the right hand side $b$ of the casing. In this position it is most convenient for the operator to handle. In the bottom of this box there is inserted a slide F with an ink pad $F'$. The dies H rest thereon and thus are kept inked, ready for use. The use of these dies and of the box are, however, not essential to the use of my improved checking machine. The amounts of sales may as well be written thereon or printed with other devices.

A dating attachment may be combined with the duplicate stamping and perforating machine, when it is desired to keep control of the dates of the transactions. To this end, brackets K are provided on the movable yoke $i$ in the position shown in Fig. 4 and the dating attachment is screwed thereto. The setting of the date, must, of course, be changed every day.

The operation of my improved checking and controlling machine is as follows:—At the start a strip of paper P made into a roll, is slid on the shaft of the reel $x$ and the outer end thereof is drawn underneath the guide-rolls $q$ then through the aperture $e$ between the edge $a'$ of the casing and the platform $c$ over the roll $q'$ and is fastened to the core $C'$ of the reel C. It is advantageous to wrap the end of the paper two or three times around the core $C'$ to secure it thereto at the proper tension, and also to insure a smooth and straight operation of the machine. Then the duplicate stamping and perforating machine is set to print the number, wherewith it is desired to begin the numbering of the entries, and the operator, by depressing handle $n$, effects the printing of the number and also the angular perforation. On the return stroke of the stamping machine, the feeding mechanism acts, shifting the portion of the paper, that has been printed upon and perforated, upon the platform $c$, where the operator enters the amount of the transaction, by printing or by writing the figures recording the transaction upon the tally sheet and upon the check; then he detaches the check or coupon and hands it to the customer or salesman, to be turned in to the cashier with the payment, or to the bookkeeper to be charged. At the end of the day's business the entries upon the tally sheet are added up and the total must agree with the total of amounts collected in cash and charged to customers on their accounts.

If any check or coupon should be lost or destroyed, or no return made to the cashier or bookkeeper, the number or numbers of such checks may be readily ascertained by checking of the numbers of the checks that were returned, and then the entry or entries on the tally sheet will show the amount of the transaction on each of the checks not returned, lost or destroyed. In this manner the retail sales are safely controlled and any deficiency in the returns at the cashier's and bookkeeper's desks are readily traceable.

As compared with the cash register and other similar devices for checking and controlling retail sales, my improved checking and controlling machine possesses the advantage of being much more simple in construction, and facilitating in a higher degree the making and preserving of the entries on the tally sheet. The entries of the transactions are visible to the person operating the machine, when they are made, and therefore, if any error should occur in making those entries, it can immediately be corrected.

I am aware that in cash registers there are means provided for keeping a continuous tally sheet and for making duplicate entries thereon, but owing to the necessity, in cash registers to have such printing done within the machine, it is not feasible to ascertain whether the printing on the tally sheet has been in fact done. Even when it is indicated that the printing on the tally sheet was missed by the omission of the printing on the check, it is not feasible to make the entry on the tally sheet. It is well known that such missing of the imprint upon the tally sheet, and upon the checks, happens quite frequently in cash registers, and often repeatedly in succession, and it is equally well known that whether such missing of the imprint happens sporadically or in groups, the missing entries cannot be traced. Thus if any fraud or error should happen, as it does, frequently, it cannot be located by the record of such a cash register whenever in the course of the day's business more than one of the checks is lost or destroyed. Nor is it feasible, to control the cash returns by the tally sheet in such case. This circumstance and the fact that the cash register is a more expensive and a more complicated apparatus than the conditions of many a retail business warrant, accounts for the present still common use of the duplicate sales slips and similar devices, which do not, and cannot, furnish any secure or dependable record for checking and controlling such sales transactions. My improved checking and controlling machine is therefore particularly suitable in all places where such manifold sales books or cash registers and similar devices are employed, and it can also be used advantageously for checking and controlling of deliveries, for checking and controlling of loading and unloading materials, and for many other similar purposes.

I claim as my invention:—

1. A checking and controlling machine, comprising a duplicate stamping device; a perforating device arranged to divide a strip of paper lengthwise, and one portion thereof transversely, the perforating device being operatively connected with the duplicate stamping device; mechanism for feeding a continuous strip of paper into the machine and mechanism for intermittently actuating the feeding mechanism by the motions of the stamping device, substantially as herein shown and described.

2. A checking and controlling machine, comprising a casing, a duplicate stamping device set on the casing; a perforating device arranged to divide a strip of paper lengthwise, and one portion thereof transversely, the perforating device being operatively connected with the duplicate stamping device; mechanism for feeding a continuous strip of paper into the machine; mechanism for intermittently actuating the feeding mechanism by the motions of the stamping device, and means for conveying the undivided portion of the strip into the casing, substantially as herein shown and described.

3. A checking and controlling machine, comprising a casing, a duplicate stamping device set on the casing; a perforating device arranged to divide a strip of paper lengthwise, and one portion thereof transversely, the perforating device being operatively connected with the duplicate stamping device; mechanism for feeding a continuous strip of paper into the machine, mechanism for intermittently actuating the feeding mechanism by the motions of the stamping device, a spring actuated core set in the casing, and means for guiding the undivided portion of the strip so as to wind it on the spring actuated core, substantially as herein shown and described.

4. A checking and controlling machine, comprising a device for duplicate stamping of numbers and for printing a date; a perforating device arranged to divide a strip of paper lengthwise, and one portion thereof transversely, the perforating device being operatively connected with the duplicate stamping device; mechanism for feeding a continuous strip of paper into the machine, mechanism for intermittently actuating the feeding mechanism by the motions of the stamping device, a spring actuated core set in the casing, and means for guiding the undivided portion of the strip so as to wind it on the spring actuated core, substantially as herein shown and described.

5. A checking and controlling machine, comprising a casing, a duplicate stamping device set on the casing, mechanism for feeding a continuous strip of paper into the stamping device, mechanism for intermittently actuating the feeding mechanism by the motions of the stamping device, means for dividing the strip lengthwise, and one portion thereof transversely, to form detachable coupons, a spring actuated core, set in the casing, and means for guiding the undivided portion of the continuous strip to the spring actuated core, substantially as herein shown and described.

MAX KUHN.

Witnesses:
V. BRAUN,
M. A. HELMKE.